US011892972B2

(12) United States Patent
Debattista et al.

(10) Patent No.: US 11,892,972 B2
(45) Date of Patent: Feb. 6, 2024

(54) SYNCHRONIZATION MECHANISMS FOR A MULTI-CORE PROCESSOR USING WAIT COMMANDS HAVING EITHER A BLOCKING OR A NON-BLOCKING STATE

(71) Applicants: Apical Limited, Cambridge (GB); Arm Limited, Cambridge (GB)

(72) Inventors: Aaron Debattista, Cambridge (GB); Jared Corey Smolens, Santa Clara, CA (US)

(73) Assignee: Arm Limited, Cambridge (GB)

( * ) Notice: Subject to any disclaimer, the term of this patent is extended or adjusted under 35 U.S.C. 154(b) by 219 days.

(21) Appl. No.: 17/469,311

(22) Filed: Sep. 8, 2021

(65) Prior Publication Data
US 2023/0077301 A1 Mar. 9, 2023

(51) Int. Cl.
*G06F 15/82* (2006.01)
*G06F 9/48* (2006.01)
*G06F 9/52* (2006.01)
*G06F 8/41* (2018.01)
*G06F 9/30* (2018.01)
*G06F 9/38* (2018.01)

(52) U.S. Cl.
CPC ............. *G06F 15/82* (2013.01); *G06F 8/458* (2013.01); *G06F 9/30087* (2013.01); *G06F 9/3851* (2013.01); *G06F 9/4881* (2013.01); *G06F 9/526* (2013.01)

(58) Field of Classification Search
CPC ...... G06F 15/82; G06F 8/458; G06F 9/30087; G06F 9/3851; G06F 9/4881; G06F 9/526; G06F 9/522; Y02D 10/00
See application file for complete search history.

(56) References Cited

U.S. PATENT DOCUMENTS

| | | | | |
|---|---|---|---|---|
| 7,321,369 B2 * | 1/2008 | Wyatt | ................... | G06T 15/005 712/E9.067 |
| 8,181,001 B2 * | 5/2012 | Gonion | ............... | G06F 9/30072 712/216 |
| 10,803,007 B1 * | 10/2020 | Volpe | .................. | G06F 15/7882 |
| 2007/0050563 A1 * | 3/2007 | Alsup | ................... | G06F 9/3842 711/145 |
| 2010/0115249 A1 * | 5/2010 | Paltashev | ................ | G06F 9/461 712/228 |
| 2014/0354644 A1 * | 12/2014 | Nystad | ...................... | G06F 9/30 345/506 |

(Continued)

Primary Examiner — Shawn Doman
(74) Attorney, Agent, or Firm — EIP US LLP

(57) ABSTRACT

Systems, apparatuses and methods suitable for optimizing synchronization mechanisms for multi-core processors are provided. The synchronizing mechanisms may be optimized by receiving a command stream which comprises a plurality of commands including one or more wait commands, wherein each wait command has an associated state and one or more associated conditions; sequentially processing each command in the command stream until a wait command is reached; checking the state associated with the wait command to be processed, wherein if said state is a blocking state, further processing of commands in the command stream is paused until each of said wait command's associated conditions are met, and wherein if said state is a non-blocking state, the next command in the command stream is retrieved and processed.

18 Claims, 5 Drawing Sheets

(56) References Cited

U.S. PATENT DOCUMENTS

| | | | |
|---|---|---|---|
| 2015/0033000 A1* | 1/2015 | Vorbach | G06F 12/1433 |
| | | | 712/221 |
| 2019/0332420 A1* | 10/2019 | Ukidave | G06F 9/5066 |
| 2019/0340722 A1* | 11/2019 | Aas | G06F 9/52 |
| 2020/0004602 A1* | 1/2020 | Pawlowski | G06F 9/30087 |
| 2020/0257555 A1* | 8/2020 | Underwood | G06F 9/3877 |

* cited by examiner

SYNCHRONIZATION MECHANISMS FOR A MULTI-CORE PROCESSOR USING WAIT COMMANDS HAVING EITHER A BLOCKING OR A NON-BLOCKING STATE

FIELD OF THE INVENTION

The present disclosure relates to systems, methods and apparatuses for synchronizing processes run by a multi-core processor. In particular, the present disclosure relates to providing synchronization mechanisms suitable for use in multi-core heterogenous neural processors.

DESCRIPTION OF THE RELATED TECHNOLOGY

A multi-core processor is a type of computer processor which has more than one processor "core", each core of the processor being able to process a task in conjunction with, or independently from, other cores of the multi-core processor. Advantages of using multi-core processors include improved processor performance and and/or energy efficiency, as compared to a single-core processor. Multi-core processors can be particularly useful when processing operations which can be split across the cores of the processors, as breaking up the operations into smaller tasks and processing the tasks in parallel across the cores can reduce the overall time to process the operations. Similarly, for relatively simple computational tasks, only a sub-set of the available cores may be required, allowing other cores to idle (reducing the power consumption of the processor), or be used to process an entirely separate task (reducing the overall time required to compute all processing tasks).

However, even with these highly specialized processors, many modern computing tasks can take a significant time to process. There therefore exists a need for improvements to multi-core processing mechanisms which can further increase the efficiency and performance of multi-core processors.

SUMMARY

According to a first aspect of the present disclosure, there is provided a method for synchronising processing in a multi-core processor, comprising: receiving a command stream which comprises a plurality of commands including one or more wait commands, wherein each wait command has an associated state and one or more associated conditions; sequentially processing each command in the command stream until a wait command is reached; and checking the state associated with the wait command to be processed, wherein if said state is a blocking state, further processing of commands in the command stream is paused until each of said wait command's associated conditions are met, and wherein if said state is a non-blocking state, the next command in the command stream is retrieved and processed.

According to a second aspect of the present disclosure, there is provided a control unit arranged to: sequentially read a command stream comprising a plurality of commands including one or more wait commands, wherein each wait command has an associated state and one or more associated conditions; issue each command that is encountered in the command stream, as the command stream is being sequentially read, to one or more cores of a multi-core processor, until a wait command is reached in the command stream; when a wait command is reached, check the state of said wait command, and: if said state is a blocking state, pause further processing of commands in the command stream until each of said wait command's associated conditions are met, otherwise if said state is a non-blocking state, continue sequentially reading said command stream and issue commands until a further wait command is read.

According to a third aspect of the present disclosure, there is provided a non-transitory computer-readable storage medium comprising a set of computer-readable instructions stored thereon, which when executed by at least one processor, cause the at least one processor to perform the steps of the first aspect.

According to a fourth aspect of the present disclosure, there is provided a system comprising: a multi-core processor having two or more processor cores; and a control unit, configured to: sequentially read a command stream comprising a plurality of commands including one or more wait commands, wherein each wait command has an associated state and one or more associated conditions; issue each command that is encountered in the command stream, as the command stream is being sequentially read, to one or more cores of the multi-core processor, until a wait command is reached in the command stream; when a wait command is reached, check the state of said wait command, and: if said state is a blocking state, pause further processing of commands in the command stream until each of said wait command's associated conditions are met, and if said state is a non-blocking state, continue sequentially reading said command stream and issue commands until a further wait command is read.

According to a fifth aspect of the present disclosure, there is provided a method for synchronizing processing in a multi-core processor, comprising; receiving an operation to be processed by a multi-core processor; converting the received operation into a plurality of commands for the multi-core processor, the plurality of commands comprising one or more wait commands, each wait command arranged to pause processing of the command stream by the multi-core processor until one or more conditions associated with said wait command are satisfied; assigning, to each wait command, a state selected from at least two states, one of said states being a blocking state which causes an associated wait command to act as a blocking wait command and another of said states being a non-blocking state which causes an associated wait command to as a non-blocking wait command; forming a command stream from the plurality of commands; and transmitting the command stream to said multi-core processor for processing.

BRIEF DESCRIPTION OF THE DRAWINGS

Further features and advantages will become apparent from the following description of preferred examples, given by way of example only, which is made with reference to the accompanying drawings in which like reference numerals are used to denote like features.

DETAILED DESCRIPTION

Details of systems and methods according to examples will become apparent from the following description with reference to the Figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Certain examples described herein provide systems, methods and apparatuses for improving the performance and/or efficiency of multi-core processors. The term multi-core processer used herein should be interpreted as referring to any processor capable of processing more than one computational task simultaneously. Thus "multi-core processor" is intended to include any processor with more than one core, and single core processors which have parallel processing capabilities. The examples described herein may also be applied to heterogenous multi-core processors.

Heterogenous multi-core processors are a sub-category of multi-core processors, one in which at least two different types of processor are used. One example of a heterogenous multi-core processor is a neural processing unit, which may use different processor types which are particularly suited for implementing neural networks. These specialized heterogenous multi-core processors can provide further efficiency and performance gains (for specific job types) over and above a more general multi-core processor, as the constituent processor types can be selected to suit a type of processing job (such as implementing neural networks).

Figure 1:
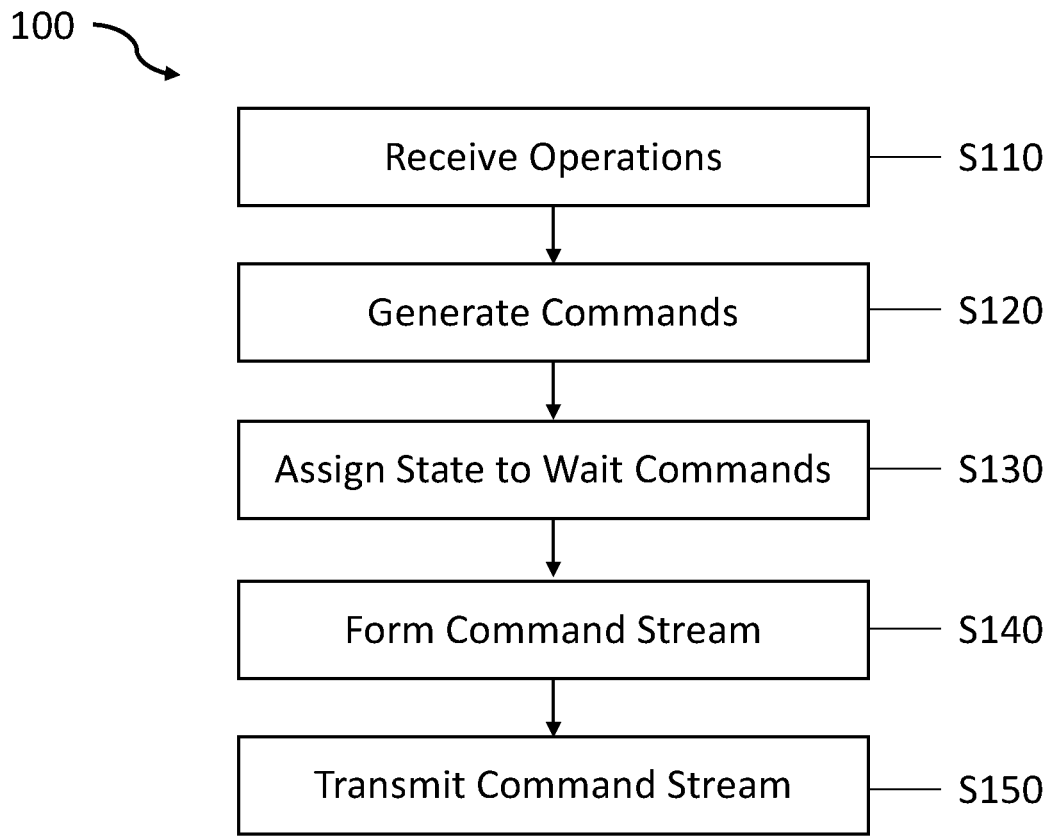
FIG. 1 is a flow chart illustrating a method of synchronizing processing according to an example.

FIG. 1 is a flow chart illustrating a method of optimizing processing in a multi-core processor in accordance with an example. The method may be implemented by any computer software or hardware that is suitable for following computer implemented instructions. The method may be implemented in, for example, software executed by a compiler program.

In the first step S110 of the method, one or more operations to be performed by a processor are received. Each operation may comprise one or more jobs that need to be computed by a processor. For example, an operation may be an image processing task, comprising an input image and one or more functions that should be applied to the input image to create an output image. In this example, each image processing step may comprise one or more jobs to be processed by a processor, where in totality the jobs perform the required operation (process the input image and produce an output image). In another example, the operation may be instructions for a neural network, or part of a neural network, that when implemented processes input data and provides an output. In this example, the jobs may correspond to individual layers or nodes of the neural network. The operation may be any other computing task which can be performed by a computer program.

At step S120, the one or more operations that have been received are broken down and/or converted into a plurality of commands which can be read and understood by a computer processor. This process is commonly known as compiling. The resultant commands can be broadly categorized into commands that fall within one of three command types: 1) wait commands, 2) setup commands, and 3) go commands.

Wait commands instruct a processor to "wait", i.e. pause, stop or idle until one or more associated conditions have been met. One condition may be a time delay, such wait command causing further processing to stop for a predetermined time period. Additionally, or alternatively, the condition may require waiting until a further command is received—i.e. wait until a "job complete" signal is received from another processor, all the processors associated with a job, or a subset of the processors associated with that job, and/or another control unit. Additionally, or alternatively, each wait command may be associated with a scoreboard value defining a number of jobs that need to be completed for said operation to be complete, wherein the wait command is satisfied once all jobs have been completed (i.e. the scoreboard value is reduced to zero). Wait commands are generally considered to be blocking commands, which when received, cause the processor to stop any further processing until the wait command is satisfied. During this idling period one or more processors of the multi-core processor will not be being utilized to perform processing tasks, which is inefficient. Alternatively, even when one or more processors are currently being utilized, the use of "blocking wait commands" prevents setup of future jobs which leads to the creation of dead cycles (when the job is eventually set up) which again leads to under-utilization of the processors. Examples provided herein seek to reduce these inefficiencies by modifying certain wait commands in an effort to reduce the overall idling time of processors. The examples provide herein enable the control unit to overlap setup of the next operation with a job currently executing in the processor(s). In this manner, more of a processor's cycles can be effectively used, speeding up processing of an operation and/or enabling more complex operations to be performed in a given time period.

Setup commands instruct a processor to prepare for a processing task. Setup commands may instruct a processor to retrieve data from memory, program a particular operation into a bank/buffer of a compute unit, or perform any other function needed to enable a processor to perform a processing task. Go commands instruct a processor to start a processing task. Generally, this is a processing task that has already been setup through the processing of one or more setup commands Whilst there are many different types of processor commands known in the art, each of these commands can be categorised into one of these three categories of commands, the use of these three categories helps aid the understanding of the following described examples, but these categories are not intended to be limiting.

Thus, at step S120, the received operation is processed to form a plurality of commands, these commands comprising wait commands, setup commands and go commands Once these commands have been generated, or as the commands are being generated, at step S130 an additional parameter is assigned to each wait command. This additional parameter will hereinafter be referred to as a state. Each state can be selected from a group of state types, comprising blocking states and non-blocking states. Further state types may be used, however the following examples focus on the use of either a blocking or non-blocking state.

In its simplest form, the presence or absence of a check bit may form the two different states described above—where the presence of a check bit may be considered to signify a non-blocking state, which modifies the wait command into a non-blocking wait command, and the absence of a check bit may be considered to mean that the wait command is non-modified, and thus a traditional blocking wait command, and hence the wait command is in a blocking state. Additionally, or alternatively, the state may assign a value to both blocking and non-blocking wait commands. The blocking and non-blocking state may be signified using any form of known machine-readable code.

A wait command with a blocking state may simply act as a normal wait command as would otherwise be known to the skilled person. Such wait commands essentially prevent further commands in a command stream from being processed until the wait command is satisfied (i.e. all of the conditions associated with the wait command have been met). However, a wait command with a non-blocking state (otherwise referred to herein as a non-blocking wait command) provides additional functionality which may improve the efficiency of processors implementing such commands.

When a non-blocking wait command is encountered and processed however, the control unit processing the command stream is not restricted from processing further commands Instead, the control unit is allowed to process the next command, or commands, in the command stream. When, for example, the next command is a setup command, the control unit may instruct one or more processors to begin a setup process even whilst the conditions associated with the wait command have not otherwise been met. This is allowable in many cases as whilst certain commands in the command stream require all processing to stop whilst prior commands are being completed, in many cases further commands may be able to be processed without causing race conditions. For example, processing further setup commands following a non-blocking wait command can make use of processor cycles that would otherwise be wasted whilst the wait command would otherwise have paused further processing. Thus, these otherwise wasted processor cycles can be used to start setting up the next task.

Similarly, when a go command is encountered, the control unit may instruct a processing task to commence in accordance with the go command, using processor cycles that would otherwise be wasted to process the next task. This situation is most likely to occur when the operation being processed by the go command has no dependency on prior or pending operations, and hence unused processors can implement the go command without causing a race condition.

Returning to the method of FIG. 1, once the states have been assigned to the wait commands by the compiler program, at step S140, a command stream is formed. A command stream in its simplest form is a concatenated sequence of commands which are to be sequentially processed by a multi-core processor and/or a control unit controlling the multi-core processor. Thus, a command stream may be formed by simply joining sequential commands into a continuous command stream. Once formed, optionally, the ordering of commands in the command stream may be optimised by the compiler. For example, the compiler may alter the sequence of commands to re-order certain commands in order to improve the processing flow whilst still respecting the functional execution of the command stream. Moreover, optionally, optimisation may comprise altering the state assigned to one or more of the wait commands in the stream, based on further analysis of adjacent or nearby commands in the commands stream. Any other known method of optimising the command stream may also be used.

At step 150, once the command stream is formed, or as it is being formed, the command stream may be transmitted to a multi-core processor and/or a control unit controlling a multi-core processor for processing. In this manner, the multi-core processor may be instructed to process operations via the command stream comprising one or more wait commands, each wait command having an associated state and one or more associated conditions.

Figure 2:
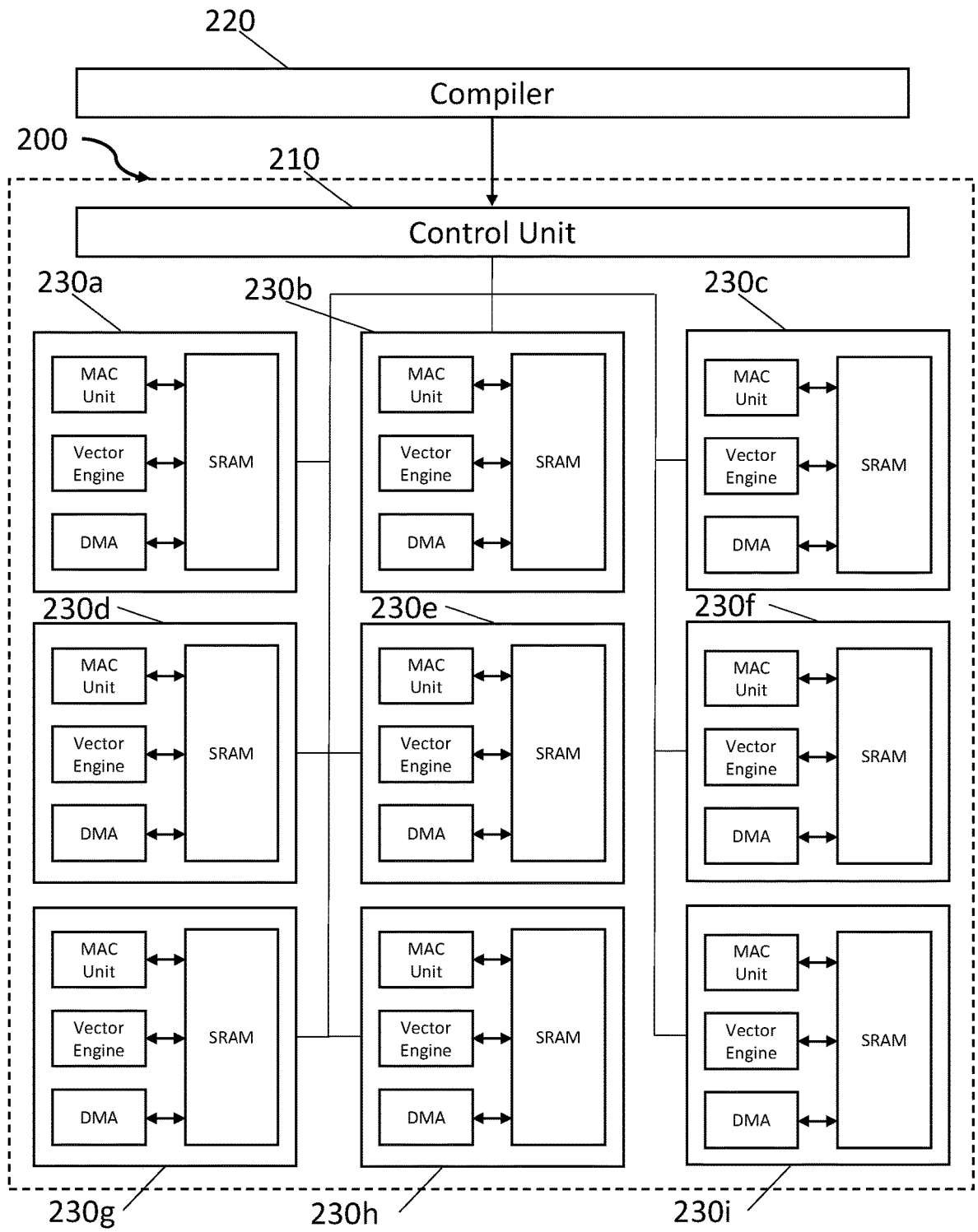
FIG. 2 is a schematic diagram illustrating a multi-core processor according to an example.

FIG. 2 schematically illustrates a multi-core processor 200 to which the methods described herein may be applied. In FIG. 2, a heterogenous multi-core processor has been shown. However, the methods described herein may be applied any other type of processor which is capable of parallelisation of tasks, such as a homogenous multi-core processor or a single core processor arranged to perform parallelised processing across its single core.

Multi-core processor 200 comprises a control unit 210. The control unit 210 will be described in more detail below. However, essentially, the function of control unit 210 is to receive a compiled command stream from an external compiler apparatus 220, and process the commands within the compiled command stream, in accordance with methods described herein.

Multi-core processor 200 also comprises two or more cores. In the present example, multi-core processor 200 has nine cores labelled 230*a*-230*i*. The control unit 210 is in data communication with each of the cores 230*a*-230*i*, enabling data to be sent between the control unit and each of the cores 230*a*-230*i*. The illustrated multi-core processor 200 may be particularly well suited for implementing a neural network, as each core is provided with three different types of compute unit, each compute unit being particularly efficient at processing one or more function typically required to implement a neural network.

The term compute unit is generally used to refer to the processing component that performs the actual processing function. In the present example, each core 230*a*-230*i* is illustrated as having three compute units, respectively labelled "MAC Unit", "Vector Engine" and "DMA". Each core could however have any number of compute units, including any type of known compute units.

Each "MAC Unit" compute unit may be a multiply-accumulator type processor, arranged to perform multiply-accumulate operations. A multiply-accumulate operation is a generally known computing step which involves computing the product of two numbers and adding that product to an accumulator. Each "Vector Engine" compute unit may be a vector processor, arranged to efficiently process large one-dimensional arrays of data (i.e. a vector). Each "DMA" unit may be a direct memory access unit arranged to process jobs where direct memory access is suitable and available.

Each core 230*a*-230*i* of the multi-core processor 200 may further comprise a memory, enabling the compute units of each core to read data from and store data in local memory as and when required. In the present example, each memory is illustrated as static random-access memory "SRAM". Any other suitable type of memory may be used. Moreover, two or more of the cores may share a common memory.

Figure 3:
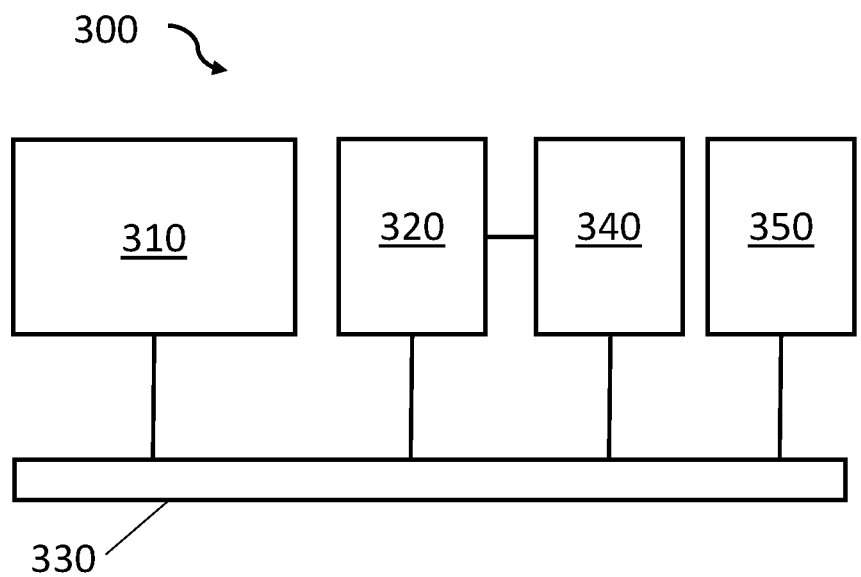
FIG. 3 is a schematic diagram illustrating a control unit according to an example.

FIG. 3 illustrates the control unit 210 of FIG. 2 in more detail. The control unit 300 of FIG. 3 may be coupled to or form part of a computer device, such as a personal computer, a laptop, a smartphone, a server, or a cloud computing environment. The control unit 300 may be integrated with a multi-core processor, or alternatively just in data communication with one or more multi-core processors. The control unit 300 includes an input 310. Input 310 may be a wired or wireless connection suitable for receiving input data from an external source. Typically, control unit 300 will receive data in the form of a command stream. However, input 310 and control unit 300 as whole may be arranged to receive and process any form of data. Input 310 may be used to receive and/or fetch any of the data referred to in this description. The input 310 may be further arranged to output data as and when required, such as the result of the processing performed by the multi-core processor that the control unit 310 controls. Any such data may be output to external storage (not shown). Alternatively, a dedicated output for outputting processed data may be provided.

Input 310 is arranged to send received input data to a central processor unit (CPU) 320 via a common systems bus 330. CPU 320 may process received data, such as a compiled command stream, and thereafter instruct one or more cores of a multi-core processor to perform one or more operations, in accordance with one or more of the methods described herein. In other examples, though, the control unit 300 may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The control unit 300 may also or alternatively include a processor implemented as a combination of computing devices, e.g., a combination of a DSP and a microprocessor, a plurality of microprocessors, one or more microprocessors in conjunction with a DSP core, or any other such configuration. The control unit 300 may also or alternatively include at least one graphics processing unit (GPU).

The control unit 300 may also include storage 340. Storage 340 may be, for example, external to the CPU 320. The storage 340 may be random-access memory (RAM) such as DDR-SDRAM (double data rate synchronous dynamic random-access memory). In other examples, storage 340 may be or include non-volatile memory such as Read Only Memory (ROM) or a solid-state drive (SSD) such as Flash memory. Storage 340 in examples may include further storage devices, for example magnetic, optical or tape media, compact disc (CD), digital versatile disc (DVD) or other data storage media. Storage 340 may act as a buffer, storing received input data until said data can be processed by CPU 320. Thus storage 340 may be arranged to store input data received from input 310.

Control unit 300 further comprises an output 350 for sending commands and/or data to be processed to cores of the multi-core processor. Output 350 may also receive data and/or commands in return from the cores of the multi-core processor.

The components of the control unit 300 in the example of FIG. 3 are interconnected using a common systems bus 330. This allows data to be quickly and easily transferred between the various components. The bus 330 may be, or include, any suitable interface or bus. For example, an ARM® Advanced Microcontroller Bus Architecture (AMBA®) interface, such as the Advanced eXtensible Interface (AXI), may be used.

Examples for generating a command stream using software executed by a compiler program have been described above. This software may be run on any suitable computing system. Examples described herein also provide for a compiler apparatus comprising computer readable media storing instructions, which when executed by a processor, can be used to form command streams with wait commands having blocking and non-blocking states in accordance with the examples described herein. Said compiler apparatus may be integral with the control unit 300. Alternatively, the command stream processing steps described herein may be performed by the control unit 300 in addition to the command stream processing steps. Alternatively, a compiler apparatus may be provided as an independent apparatus, as shown in FIG. 4.

Figure 4:
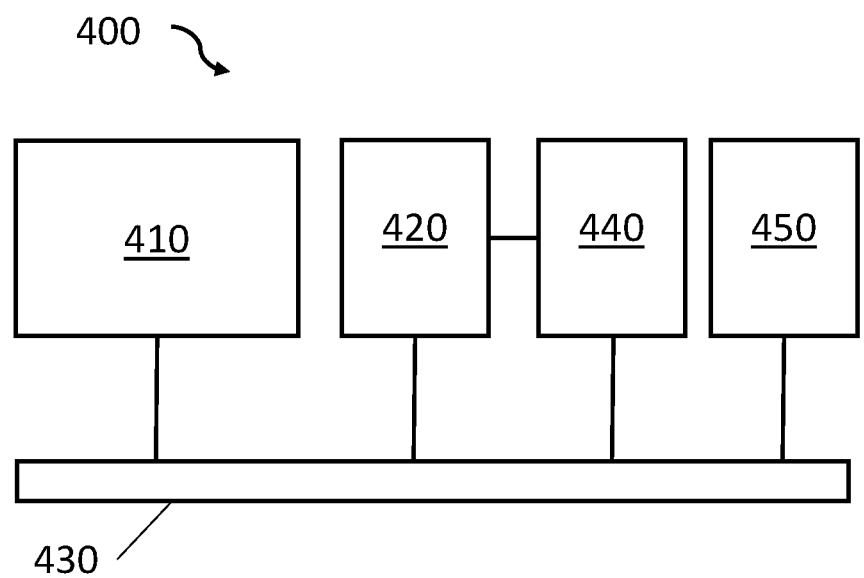
FIG. 4 is a schematic diagram illustrating a compiler apparatus according to an example.

FIG. 4 illustrates an exemplary compiler apparatus 400. Compiler apparatus 400 may be coupled to, or form part of, a computer device, such as a personal computer, a laptop, a smartphone, a server or a cloud computing environment. The compiler apparatus 400 may be integrated with the control unit, or alternatively just in data communication with the control unit. The compiler apparatus 400 includes an input 410. Input 410 may be a wired or wireless connection suitable for receiving input data from an external source. Typically, Compiler apparatus 400 will receive data in the form of data defining one or more operations, or a series of operations arranged as a graph, to be performed by the multi-core processor. However, input 410 and compiler apparatus 400 as whole may be arranged to receive and process any form of data. Input 410 may be used to receive and/or fetch any of the data referred to in this description. The input 410 may be further arranged to output data as and when required, such as a command stream suitable for processing by a control unit. Any such data may be output to external storage (not shown). Alternatively, a dedicated output for outputting processed data may be provided.

Input 410 is arranged to send received input data to a central processor unit (CPU) 420 via a common systems bus 430. CPU 420 may process received data, such as one or more operations, and thereafter form a command stream for sending to a control unit controlling one or more multi-core processors to perform said operations, in accordance with one or more of the methods described herein. In other examples, though, the compiler apparatus 400 may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The compiler apparatus 400 may also or alternatively include a processor implemented as a combination of computing devices, e.g., a combination of a DSP and a microprocessor, a plurality of microprocessors, one or more microprocessors in conjunction with a DSP core, or any other such configuration. The compiler apparatus 400 may also or alternatively include at least one graphics processing unit (GPU).

The compiler apparatus 400 may also include storage 440. Storage 440 may be, for example, external to the CPU 420. The storage 440 may be random-access memory (RAM) such as DDR-SDRAM (double data rate synchronous dynamic random-access memory). In other examples, storage 440 may be or include non-volatile memory such as Read Only Memory (ROM) or a solid-state drive (SSD) such as Flash memory. Storage 440 in examples may include further storage devices, for example magnetic, optical or tape media, compact disc (CD), digital versatile disc (DVD) or other data storage media. Storage 440 may act as a buffer, storing received input data until said data can be processed by CPU 420. Thus storage 440 may be arranged to store input data received from input 410.

Compiler apparatus 400 further comprises an output 450 for sending command streams and/or other data to be processed to one or more control units. Output 450 may also receive data and/or commands in return from the cores of the multi-core processor and/or the one or more control units.

The components of the compiler apparatus 400 in the example of FIG. 4 are interconnected using a common systems bus 430. This allows data to be quickly and easily transferred between the various components. The bus 430 may be, or include, any suitable interface or bus. For example, an ARM® Advanced Microcontroller Bus Architecture (AMBA®) interface, such as the Advanced eXtensible Interface (AXI), may be used.

Figure 5:
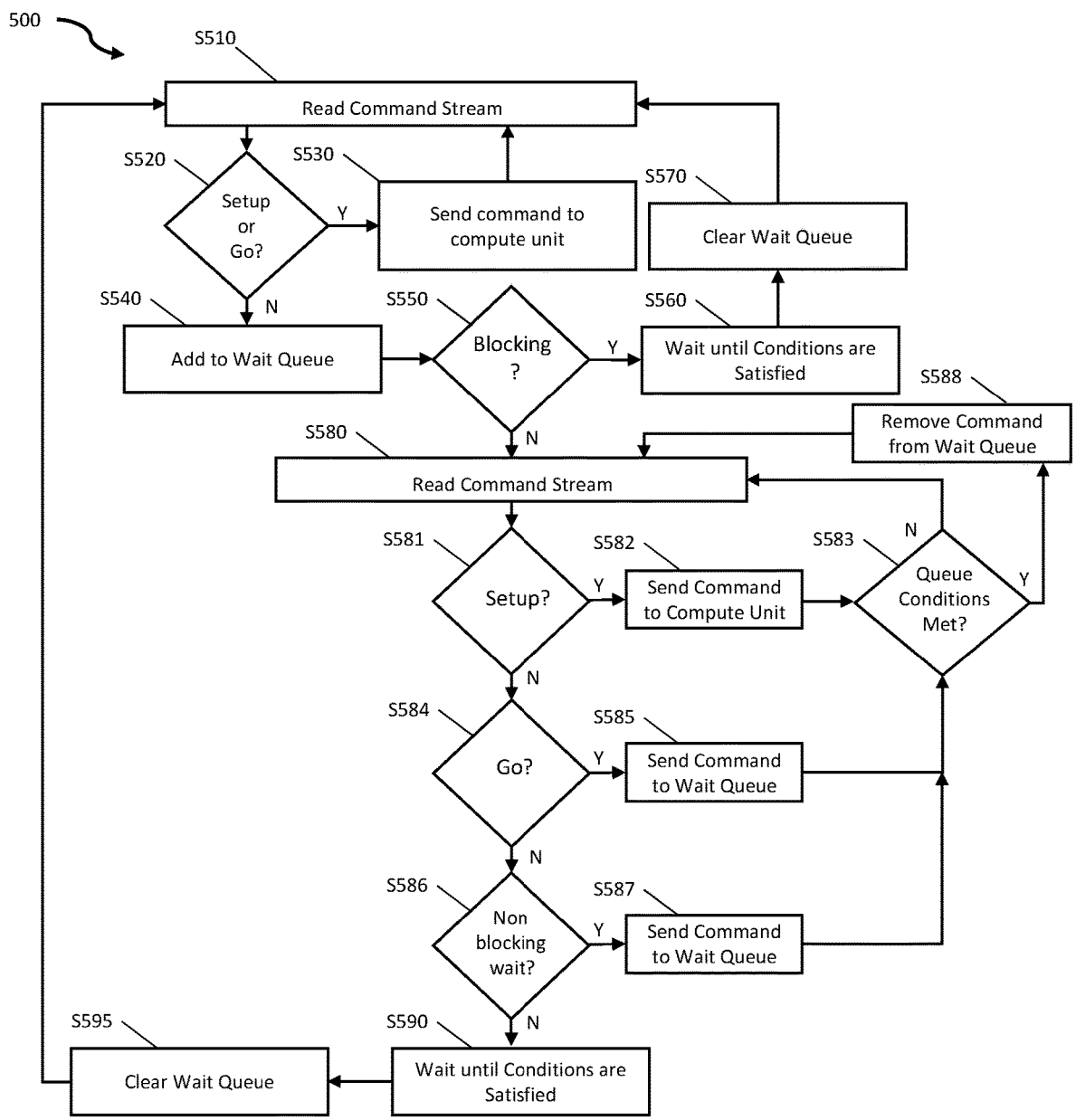
FIG. 5 is a flow diagram illustrating a method according to an example.

FIG. 5 is a flow chart illustrating a method of optimizing processing in a multi-core processor in accordance with an example. The method may be implemented by any computer software or hardware that is suitable for following computer implemented instructions. The method may be implemented in, for example, software executed by a compiler program. Additionally, this method may be implemented by a control unit in accordance with that shown in FIG. 3, operating as part of a multi-core processor in accordance with that shown in FIG. 2.

At step S510 a first command from a command stream is read. The command stream may be, for example, a compiled command stream as described above. In the following method, reading of the command stream refers to sequential reading of each command in turn, in the order the commands are received. However, any other known method of reading a command stream may be used. At step S520 of the method, a decision is made based on what type of command is read at step S510. If the command is a setup command or a go command, then the method continues to step S530, wherein the command that was read at step S510 is sent to an appropriate core of the multi-core processor for processing. Once the command has been sent, the method returns to step S510, where the next command in the command stream is read.

Returning to step S520, if the command is neither a setup command or a go command, i.e. it is wait command, the method moves on to step S540, where the wait command is added to a wait queue, which may be maintained by the control unit. The wait queue may be an ordered queue, in which each command is processed sequentially. The wait queue enables the control unit to track outstanding wait commands. The wait queue may be any held in any form of memory and may comprise a listing of wait or go commands which currently have outstanding conditions which have not yet been satisfied. The wait queue may be separate to, or part of, the scoreboard table described herein.

Next, at step S550, a further decision is made based on whether the wait command is a blocking or non-blocking wait command (as indicated by determining what the state associated with the particular wait command is). If the wait command is found to be a blocking wait command (i.e. by the presence of a state indicative of a blocking wait command, or the absence of any state marking the wait command as a non-blocking wait command) then further reading and processing of commands is paused at step S560, until all of the conditions associated with the blocking wait command have been met. These conditions may be, for example, the expiry of a wait timer and/or receipt of one or more job complete commands associated with the completion of jobs started by earlier commands in the command stream. Once the blocking wait command's associated conditions have been met at step S560, the method moves to step S570 where the blocking wait command whose conditions have been satisfied is removed from the wait queue, in order to keep the size of the wait queue small for efficient processing. After this, the method returns to step S510 where the next command in the command stream is read and the method repeats until all of the commands in the command stream have been read and processed.

If at step S550 the wait command is found to be a non-blocking wait command (through identification of an associated non-blocking state), the method moves on to step S580, where the next command in the command stream is read. The manner of processing the command read at step S580 is then dependent on the type of command that is read. In the following, each command type will be discussed in turn, the order of processing described for these steps is arbitrary and is not intended to be limiting.

If the command read at step S580 is a setup command (as illustrated by step S581), the setup command is sent to an appropriate core of the multi-core processor for processing at step S582. Following this, a decision is made at step S583 dependent on whether the conditions associated with the wait command(s) held in the wait queue have been satisfied (indicating further processing jobs may be started without restriction) or whether the wait command(s) still have outstanding conditions that have not been satisfied. If wait commands are present in the wait queue which have not yet been satisfied, the method returns to step S580 where a further command is read from the command stream and the method continues.

If at step S583 all of the conditions associated with the wait command(s) held in the wait queue have been satisfied, the method moves to step S588 where the wait command(s) whose conditions have been satisfied are removed from the wait queue, in order to keep the size of the wait queue small for efficient processing. After this, the method returns to step S580 where the next command in the command stream is read and the method continues.

Returning back to step S580, if the command read at step S580 is a go command (as illustrated by step S584), the go command is placed into an ordered queue at step S585. This queue may be, for example, the wait queue (as illustrated). Alternatively, go commands found at this step may be held in a go queue, or any other suitable location. Go commands may be held in a queue to prevent them from launching whilst there are unfulfilled wait commands (blocking or non-blocking) listed in the wait queue. However, the presence of a go command in the command stream may not block further processing of setup commands in accordance with the methods described herein.

Following the queuing of the go command, the method returns to step S583, where the wait queue is checked again to see if there are wait command(s) with associated conditions that have still not been fulfilled. As before, if all of the queue conditions have not been met, the method returns to step S580 where a further command is read from the command stream and the method continues. If at step S583 all of the conditions associated with the wait command(s) held in the wait queue have been satisfied, the method returns to step S588 where the wait command(s) whose conditions have been satisfied are removed from the wait queue, in order to keep the size of the wait queue small for efficient processing. At the same time, any go commands which held in a queue and were blocked by the removed wait command(s) can be released and sent to an appropriate core of the multi-core processor for processing. After this, the method returns to step S580 where the next command in the command stream is read and the method continues.

Returning back to step S580, if the command read at step S580 is a further non-blocking wait command (as illustrated by step S586), the non-blocking wait command is added to the wait queue at step S587, where it may be used to apply further wait conditions to either the current operation being processed, or future operations. The presence of a further non-blocking wait command in the command stream may not block further processing of setup commands in accordance with the methods described herein.

Following the queuing of the non-blocking wait command, the method returns to step S583, where the wait queue is checked again to see if there are wait command(s) with associated conditions that have still not been fulfilled. In some examples, only wait commands in the queue associated with the current operation may be considered at this step. Alternatively, all wait commands in the queue may need to be satisfied. Either way, if relevant queue conditions have not been met, the method returns to step S580 where a further command is read from the command stream and the method continues. If at step S583 all conditions associated with the wait command(s) held in the wait queue have been satisfied, the method returns to step S588 where the wait command(s) whose conditions have been satisfied are removed from the wait queue. At the same time, any go commands which are held in a queue and were blocked by the removed wait command(s) can be released and sent to an appropriate core of the multi-core processor for processing. After this, the method returns to step S580 where the next command in the command stream is read and the method continues.

Finally, returning back to step S580, if the command read at step S580 is a blocking wait command, the method moves to step S590 where further reading and processing of commands is paused, until all of the conditions associated with the blocking wait command and any wait commands in the wait queue have been met. Optionally, this blocking wait command may be added to the wait queue. However, as no further processing of commands occurs until this blocking wait command (and any other wait commands in the wait queue) are fulfilled, it is not always necessary to add this blocking wait command to the queue. Once the conditions have been satisfied at step S590, the method moves to step S595 where the wait command(s) whose conditions have been satisfied are removed from the wait queue, and any queued go commands are released and sent to an appropriate core of the multi-core processor for processing. After this, the method returns to step S510 where the next command in the command stream is read and the method repeats until all of the commands in the command stream have been read and processed.

In this manner, additional commands from the command stream can be read and thereafter processed, even whilst a non-blocking wait command having associated conditions which have not yet been met is present in the wait queue, until a blocking wait command is encountered in the command stream. This enables processor cycles that would otherwise be wasted to be used to process further commands in the command stream, whilst the non-blocking wait command is still active, which may improve the overall efficiency of processing the command stream.

As described previously, the plurality of commands in a given command stream may define one or more operations to be performed by a multi-core processor. Some of these operations may be relatively simple which require only a single processor to complete them. A simple operation may comprise 1) a wait command which is used to ensure that processing of any prior jobs on which the operation is dependent is complete, 2) a setup command which is used to setup a processor of the multi-core processor in preparation for processing the operation (i.e. fetching the necessary data for processing), and 3) a go command which is used to instruct the processor of the multi-core processor to start processing the job that it has been set.

In contrast, other operations may require multiple processors to implement different parts of the operation (otherwise referred to as jobs). These multi-processor operations will hereinafter be referred to as multi-job operations. However, even multi-job operations can still set be set up by three commands, a setup command arranged to configure each processor, a go command arranged to initiate a job on each processor when required, and a wait command to wait on one or multiple cores as required. The use of three processors is just an example, in practice any number of processors may be used to complete a multi-job operation, up to the limit of the available hardware.

Each operation may have several associated dependencies, which may comprise a requirement for an earlier operation (or a number of earlier operations) to be completed before a further operation can commence (as the outcome of the earlier operation(s) may affect the current operation), a requirement for one or more cores of the multi-core processor to have completed one or more setup commands of the current operation, and/or a requirement for one or more cores of the multi-core processor to have completed a job associated with a go command before other cores may commence processing. Consequently, even a simple operation may have several dependencies.

The number of dependencies a given operation has may be used to decide whether a wait command forming part of said operation should be a blocking wait command (requiring a complete stop of further processing until all conditions are met) or a non-blocking wait command (enabling further commands to be processed whilst certain associated conditions have not been met). For example, a completely independent operation (one which has no link to a prior operation, or data processed by a prior operation) is likely to have no dependencies (i.e. it does not need to wait for a prior operation to complete before it is started). In such a case, whilst a wait command may still be required to ensure sufficient processor capacity is available (or any other known reason), this wait command could be modified to be a non-blocking wait command, enabling the operation's setup and go commands to be processed by the control unit in accordance with the methods described herein, whilst any other conditions of the wait command are met. However, a lack of dependencies is not the only indicator that may be used to decide whether or not a wait command should be blocking or non-blocking.

In some examples, operations with dependencies may still have associated non-blocking wait commands. For example, where an operation requires several different processors to prepare for processing through a setup command, any processor whose job is not dependent on the output of a previous job can process its setup command, through the use of a non-blocking wait command. Similarly, in a complex multi-job operation, some jobs may be processed in their entirety (i.e. a setup command and a go command are implemented), whilst other jobs are put on hold due to their dependency on a prior job. In some examples, additional wait commands may be required to enable a multi-job operation to be processed differentially, i.e. causing some processors of the multi-core processor to prepare for and/or process a job through the use of a non-blocking wait command, whilst other processors are caused to wait through the use of a blocking wait command. In such examples, multiple non-blocking wait commands may be being processed simultaneously with a blocking wait command.

Figure 6:
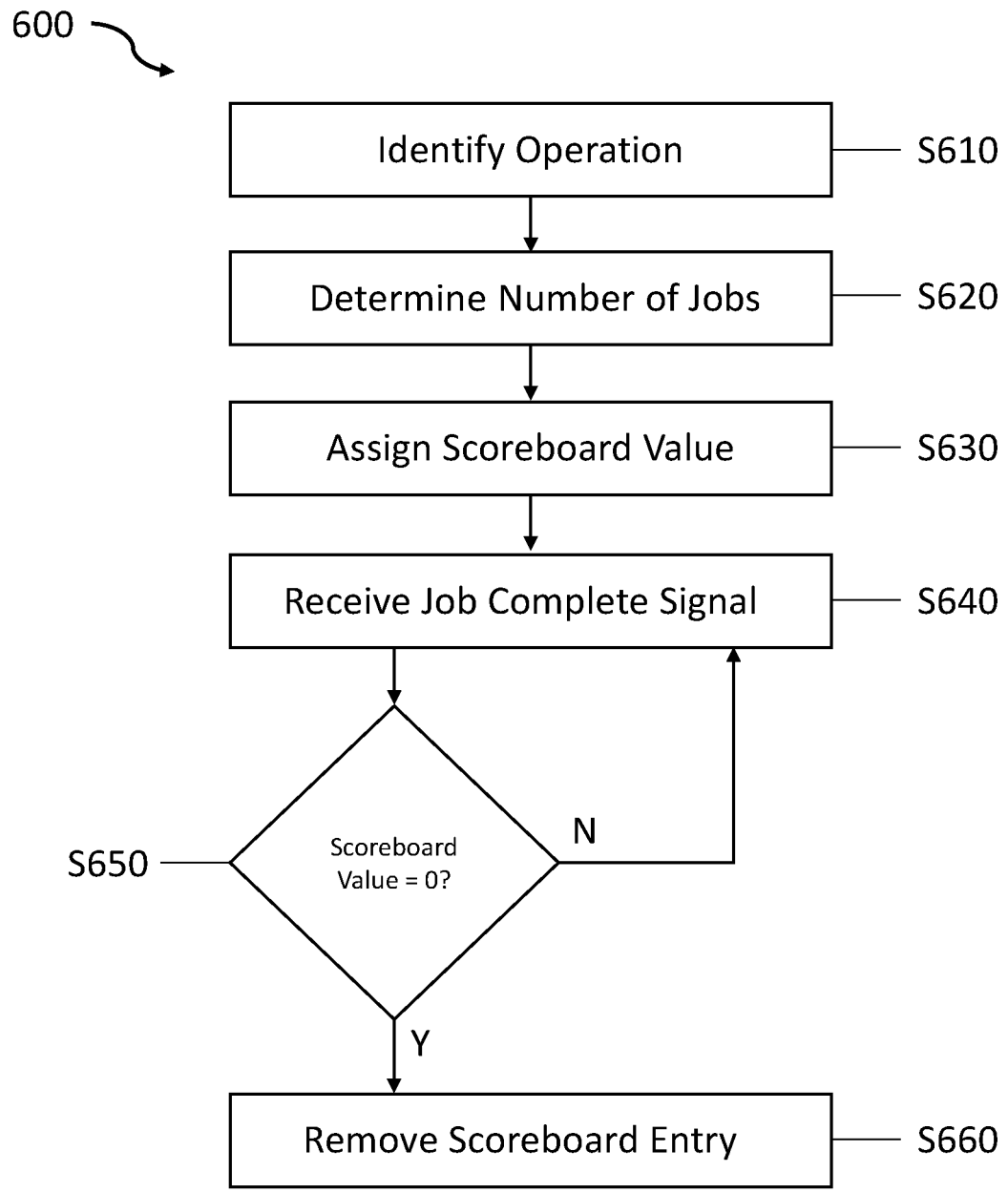
FIG. 6 is a flow diagram illustrating a method according to an example.

To aid in keeping track of these dependencies, the apparatuses, systems and methods described herein may maintain and make use of a scoreboard table, in addition to or in conjunction with the previously described wait queue. FIG. 6 is a flow chart 600 illustrating a method of using such a scoreboard, which can be associated with one or more of operations and used to provide one or more of the conditions associated with each wait command. At step S610, an operation is identified, the operation comprising a plurality of commands in the command stream. Each operation may be identified by the compiler apparatus analysing the command stream as it is being generated, or after it has been generated, and identifying groups of commands which are related and/or can be performed simultaneously using different cores of the multi-core processor. Additionally, or alternatively, operations may be identified by identifying wait commands present in the command stream and grouping each command between consecutive wait commands into a single operation. Additionally, or alternatively, any other known method of identifying an operation from an analysis of commands in a command stream may be used.

Once an operation has been identified, at step S620 the number of jobs which form the identified operation is determined by the compiler apparatus. In one example, the number of jobs may simply equal the number of commands which form the identified operation. Additionally, or alternatively, one or more of the jobs may comprise two or more commands. In some examples a job comprises all of the commands which are meant for a particular processor of the multi-core processor. I.e. if an operation is to be processed by two processors, the operation may comprise two jobs, each job having at least one setup command and at least one go command Additionally, or alternatively, each processor may be destined to receive more than one job to perform as part of the overall operation.

Once the number of jobs has been determined, at step S630, a scoreboard value is assigned to the identified operation by the compiler apparatus. The scoreboard value may be a simple integer value. The scoreboard value is indicative of the number of jobs that need to be completed for said operation to be complete. In one example, the scoreboard value may effectively be a count of the number commands which comprise the identified operation. Alternatively, the scoreboard value may be indicative of the number of jobs which comprise the identified operation. Additionally, or alternatively, the scoreboard value may be indicative of a number of processors required to process jobs as part of the identified operation. Moreover, the scoreboard value may be indicative of the number of dependencies on prior operations the identified operation has, which need to be satisfied before the identified operation can proceed.

Once the scoreboard value(s) have been assigned, the scoreboard values may be sent to the control unit in conjunction with the command stream. The scoreboard values may form part of the command stream, or may be sent separately. Once received, the scoreboard value(s) may be stored in any form of memory, either as part of the multi-core processor, part of the control unit or any other part of the system processing the operation. The stored scoreboard values form the scoreboard table, which may then be used by the control unit to help synchronise processing of operations. In this example, a single scoreboard value is described for simplicity. However, in use, multiple operations may be tracked simultaneously, with each operation having its own scoreboard value, each value being maintained and processed in a scoreboard table, in accordance with the methods described herein.

At step S640, a job complete signal is received by the control unit. The job complete signal may indicate one or more of: a) a preceding operation upon which the identified operation is dependent has completed, b) a command forming part of the identified operation has been completed, and/or c) a job forming part of the identified operation has been completed. Once a job complete signal has been received, the control unit maintaining the scoreboard table may decrement the scoreboard value of the operation to which the job complete signal relates by 1.

At step S650, after a scoreboard value has been decremented by 1, the method may check if the scoreboard value now equals zero. This check may comprise comparison of the scoreboard value with a threshold value, by the control unit. The threshold value may be an integer value equal to one, and thus if the scoreboard value is lower than one, the scoreboard value equals zero. If the scoreboard value does not equal zero, (indicating further jobs for a particular operation need to be completed), the method may wait until a further a job complete signal is received and thereafter repeat method step S640 and/or S650.

If at step S650 the scoreboard value for a particular operation is now equal to zero (indicating that the operation as a whole is complete), at step S660 the scoreboard value for the operation may be removed from the scoreboard table. Optionally, an operation complete signal may be generated and sent in order to indicate the completion of an operation. In some examples, this operation complete signal may be used by other operations tracked by the scoreboard table as a job complete signal in accordance with step S640.

In further examples, generation of an operation complete signal may cause a synchronisation command to be created by the control unit, or any other suitable processor. The synchronisation signal may be sent to each core of the multi-core processor which was used to perform a job as part of the completed operation, or a subset of these cores. This synchronisation signal may be used by each core that receives it to initiate a synchronisation procedure, before proceeding with any further commands it receives.

In the above examples, the operations processed by the multi-core processor have been described in very general terms, as the examples described herein may be applied to any type of computer operation that can be processed by a multi-core processor. The multi-core processor in the above described examples may be a homogeneous multi-core processor, in which each processor is of the same type. The same examples can be applied to heterogenous multi-core processors, such as neural processing units (such as multi-core processor 200 of FIG. 2). The examples described herein can also be advantageously applied to the implementation of neural networks using such heterogenous multi-core processors.

In the examples described herein, operations to be performed by the multi-core processor have been described in relatively simple terms, in order to aid understanding. However, in use, the command stream and the operations it defines may be extremely complex and comprise many thousands of individual commands. Moreover, the operations described so far have been processor agnostic. Whilst these situations may be common, the examples described herein can be applied to very complex commands streams on any multi-core processor type, without requiring any fundamental changes to the example methods described.

Consider for example a heterogenous multi-core processor (such as that shown in FIG. 2), which comprises two or more different processor types, such as MAC units, Vector Engines and DMA units, which is used to process a large neural network comprising many different processing nodes. In such an example, the neural network to be processed by said heterogenous multi-core processor may again be broken down into a series of processor commands in the same manner as any other computer task. Whilst these commands may be directed to different processor types in the multi-core processor, the commands still fall within the previously described categories of wait commands, setup commands and go commands. For example, MAC setup commands and MAC go commands may be generated for the MAC units, Vector Engine setup commands and Vector Engine go commands may be generated for the Vector Engines, and DMA unit setup commands and DMA unit go commands may be generated for the DMA unit. The control unit may be configured to direct the correct command type to the correct processor, enabling each processor type to process the type of command it is best suited to process.

When processing the command stream, the control unit may be configured to send Vector Engine commands to a Vector Engine of the multi-core processor, DMA unit commands to a DMA unit of the multi-core processor, and MAC unit commands to a MAC unit of the multi-core processor. During, or at the end of each operation, processors of the multi-core processor may need to synchronise with each other before proceeding with other operations. For example, each DMA unit used to process a particular operation may need to synchronise with other DMA units of the multi-core processor before further commands are processed (likewise for the Vector Engines and the MAC units). This synchronisation requirement may be considered to be a dependency between commands across two subsequent operations, which requires the use of a wait command (to pause further processing until the synchronisation process is complete.

Even in this more complex example, this synchronisation process can be controlled through use of the same type of wait commands described herein. A blocking wait command in accordance with the examples described herein may be used to control synchronisation between operations where it is critical that an earlier operation is completed before any jobs of a later operation can start (where for example the initial setup commands for a Vector Engine are dependent on a data output of a previous operation). Whereas, where some commands of a later operation are not dependent on the outcome of previous operations (for example where a MAC unit's job is not dependent on a previous operation), a non-blocking wait command can be used to enable the control unit to continue processing setup and go commands whilst the processor cores are actively working on prior jobs. In this way, complex operations can be processed in a more efficient manner through the implementation of both blocking and non-blocking wait commands.

The above examples are to be understood as illustrative examples of the present disclosure. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

Hereinafter follows a series of numbered clauses describing examples of further synchronisation methods. Where a clause refers to a preceding numbered clause, the subject matter of the two clauses may be combined in a further example.

1. A method for synchronising processing in a multi-core processor is described, comprising; receiving an operation to be processed by a multi-core processor; converting the received operation into a plurality of commands for the multi-core processor, the plurality of commands comprising one or more wait commands, each wait command arranged to pause processing of the command stream by the multi-core processor until one or more conditions associated with said wait command are satisfied; assigning, to each wait command, a state selected from at least two states, one of said states being a blocking state which causes an associated wait command to act as a blocking wait command and another of said states being a non-blocking state which causes an associated wait command to as a non-blocking wait command; forming a command stream from the plurality of commands; and transmitting the command stream to said multi-core processor for processing.

2. The method of clause 1, further comprising: analysing the plurality of commands to identify dependencies between commands; and optimising the order of commands in the command stream to reduce the number of dependencies.

3. The method of clause 1, further comprising: identifying conflicts between two or more commands of the plurality of commands; re-arranging the command stream, before transmission, to reduce the number of conflicts between commands of the command stream.

4. The method of clause 1, wherein assigning a state to each wait command comprises: identifying a wait command amongst the plurality of commands; determining if said wait command is associated with one or more dependencies; and if one or more dependencies are associated with said wait command, assigning a blocking state to said wait command, otherwise if no dependencies are associated with said wait command, assigning a non-blocking state to said wait command

What is claimed is:

1. A method for synchronising processing in a multi-core processor, comprising:
    receiving a command stream which comprises a plurality of commands including one or more wait commands and one or more setup commands, wherein each wait command has an associated state and one or more associated conditions;
    sequentially processing each command in the command stream until a wait command is reached;
    adding said wait command to a wait queue; and
    checking the state associated with the wait command to be processed,
    wherein if said state is a blocking state, further processing of commands in the command stream is paused until each of said wait command's associated conditions are met,
    wherein if said state is a non-blocking state, a next command in the command stream is retrieved and processed, wherein when said next command is a setup command, processing of said next command comprises sending said setup command to one or more cores of the multi-core processor for implementation, and
    wherein when all of said wait command's one or more associated conditions are met, said wait command is removed from the wait queue.

2. The method of claim 1, wherein the plurality of commands define at least one multi-job operation to be processed by a multi-core processor, the at least one multi-job operation comprising two or more jobs.

3. The method of claim 2, wherein the two or more jobs include at least one of setup commands or go commands, wherein a setup command instructs one or more cores of the multi-core processor to prepare to process data and wherein a go command instructs one or more cores of the multi-core processor to commence processing of data.

4. The method of claim 2, wherein said at least one multi-job operation comprises jobs which are to be distributed across different cores of the multi-core processor and require a synchronisation process to be performed during or after said at least one multi-job operation.

5. The method of claim 4, wherein each multi-job operation of said at least one multi job operation is associated with at least one wait command and wherein the one or more associated conditions are indicative of whether a synchronisation process is required by each multi-job operation.

6. The method of claim 2, wherein said state is selected from at least two states, one of said states being a blocking state which causes an associated wait command to act as a blocking wait command and another of said states being a non-blocking state which causes an associated wait command to act as a non-blocking wait command.

7. The method of claim 2, further comprising:
maintaining a scoreboard table, wherein each multi-job operation is added to the scoreboard table; and
assigning a scoreboard value to each multi-job operation in the scoreboard table, wherein the scoreboard value is indicative of a number of cores of said multi-core processor that are expected to be used for each multi-job operation.

8. The method of claim 7, further comprising:
receiving a complete signal from a core of the multi-core processor when a job is completed; and
updating a scoreboard table entry for a multi-job operation associated with the completed job, wherein updating the scoreboard table entry comprises decrementing said associated multi-job operation's scoreboard value by 1.

9. The method of claim 8, further comprising:
comparing the scoreboard value of each multi-job operation to a threshold value; and
generating an operation complete signal for each multi-job operation whose scoreboard value is less than said threshold value.

10. The method of claim 9, wherein the threshold value is an integer value equal to one.

11. The method of claim 9, further comprising:
generating a synchronisation command; and
sending said synchronisation command to each core of the multi-core processor used in the completed multi-job operation.

12. The method of claim 7, wherein one of each wait command's associated conditions requires a multi-job operation's scoreboard value to be decremented to zero, thereby indicating an associated multi-job operation is complete.

13. The method of claim 1, wherein the multi-core processor is a multi-core heterogenous processor, and wherein the multi-core heterogenous processor comprises one or more Multiply-Accumulate (MAC) Units, Vector Engines and/or Direct Memory Access (DMA) units.

14. The method of claim 1, wherein the plurality of commands further comprises one or more go commands and wherein if said state is a non-blocking state and when said next command is a go command, processing of said next command comprises adding said go command to the wait queue.

15. The method of claim 1, wherein if said state is a non-blocking state and when said next command is a non-blocking wait command, processing of said next command comprises adding said non-blocking wait command to the wait queue.

16. A control unit arranged to:
sequentially read a command stream comprising a plurality of commands including one or more wait commands and one or more setup commands, wherein each wait command has an associated state and one or more associated conditions;
issue each command that is encountered in the command stream, as the command stream is being sequentially read, to one or more cores of a multi-core processor, until a wait command is reached in the command stream;
when said wait command is reached, add said wait command to a wait queue and check the state of said wait command, and:
if said state is a blocking state, pause further processing of commands in the command stream until each of said wait command's associated conditions are met,
otherwise if said state is a non-blocking state, retrieve and process a next command in the command stream, wherein when said next command is a setup command, processing of said next command comprises sending said setup command to one or more cores of the multi-core processor for implementation, and
wherein when each of said wait command's associated conditions are met, said wait command is removed from the wait queue.

17. A non-transitory computer-readable storage medium comprising a set of computer-readable instructions stored thereon, which when executed by at least one processor, cause the at least one processor to perform the steps of claim 1.

18. A system comprising:
a multi-core processor having two or more processor cores; and
a control unit, configured to:
sequentially read a command stream comprising a plurality of commands including one or more wait commands and one or more setup commands, wherein each wait command has an associated state and one or more associated conditions;
issue each command that is encountered in the command stream, as the command stream is being sequentially read, to one or more cores of the multi-core processor, until a wait command is reached in the command stream;
when said wait command is reached, add said wait command to a wait queue and check the state of said wait command, and:
if said state is a blocking state, pause further processing of commands in the command stream until each of said wait command's associated conditions are met,
if said state is a non-blocking state, retrieve and process a next command in the command stream, wherein when said next command is a setup command, processing of said next command comprises sending said setup command to one or more cores of the multi-core processor for implementation, and
wherein when each of said wait command's associated conditions are met, said wait command is removed from the wait queue.

* * * * *